Dec. 27, 1938. T. SATO 2,141,319
SIMPLIFIED STRUCTURE FOR DRIVING SPINNING BLADES
Filed April 7, 1936
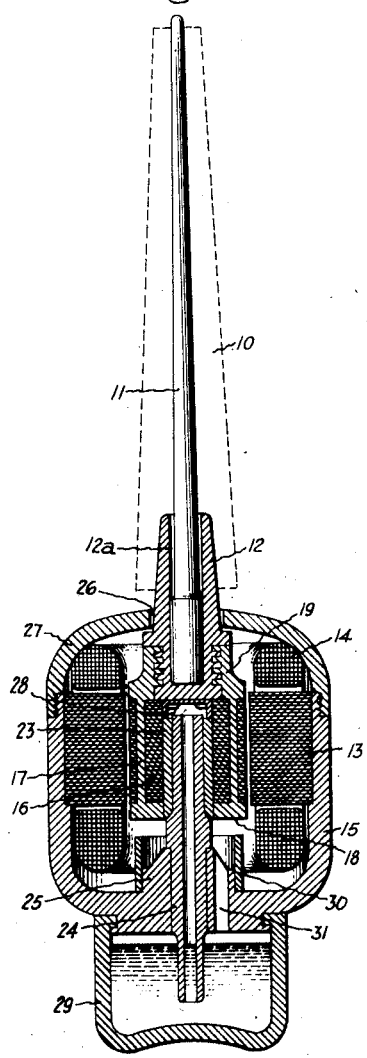
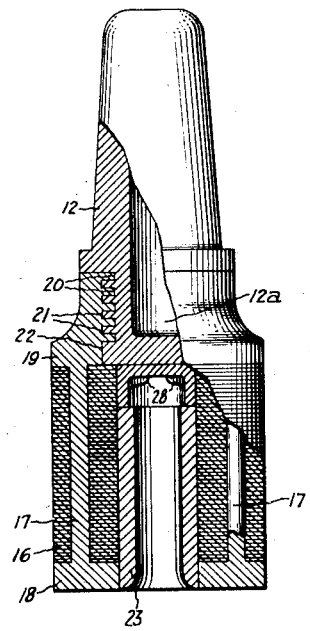
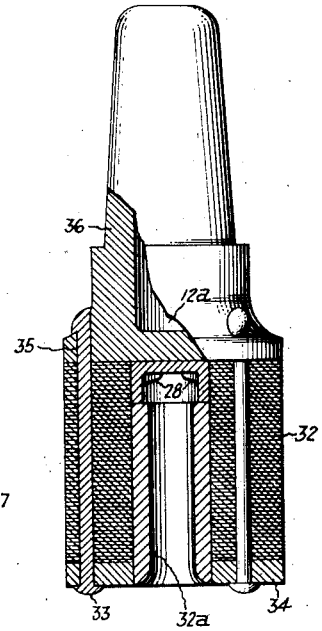
Inventor:
Takeo Sato,
by Harry E. Dunham
His Attorney.

UNITED STATES PATENT OFFICE 2,141,319

SIMPLIFIED STRUCTURE FOR DRIVING SPINNING BLADES

Takeo Sato, Tokyo, Japan, assignor to General Electric Company, a corporation of New York Application April 7, 1936, Serial No. 73,118
In Japan July 9, 1935

4 Claims. (Cl. 172—120)

My invention relates to improved and simplified structures for driving spinning blades and in particular to clutch and driving motor constructions of the vertical shaft type, such as are used in the textile industry.

An object of my invention is to provide an improved and simplified clutch and driving motor construction wherein the clutch and the rotor of the motor are rigidly secured together by the rotor winding.

Further objects and advantages of my invention will become apparent and my invention will be better understood from the following description referring to the accompanying drawing, and the features of novelty which characterize my invention will be pointed out with particularity in the claims appended to and forming a part of this specification.

In the drawing, Fig. 1 is a vertical sectional view of a clutch and spinning motor embodying my invention; Fig. 2 is an enlarged partial sectional elevation of the clutch and rotor shown in the embodiment of my invention in Fig. 1; and Fig. 3 is a partial sectional elevation of another modification of a clutch and rotor for use in the motor construction shown in Fig. 1.

Referring to the drawing, in Fig. 1, I have indicated a spinning bobbin 10 mounted on a spinning spindle or blade 11, which is secured in an easily detachable manner by frictional engagement with a clutch 12. This clutch 12 is driven by a vertical shaft motor having a stationary member including a laminated core 13 secured in a frame 15 and a winding 14 arranged in slots in the core 13. The rotor of this driving motor comprises a laminated core 16 having slots formed therein and is provided with a cast winding including conductors 17 cast integral with short circuiting end rings 18 and 19. As more clearly shown in Fig. 2, the clutch 12 is provided with a series of annular grooves 20 and tongues 21 on the outer periphery of the clutch adjacent the lower end 22, and the end ring 19 is cast about these clutch grooves 20 and tongues 21, so as to secure the clutch 12 to the laminated core 13 in engagement therewith, forming a unitary structure. The rotor is provided with a bearing 23 secured thereto, and this bearing is rotatably mounted on the upper portion of a hollow shaft 24 rigidly mounted in a boss 25 formed in the lower end of the stator frame. The clutch 12 projects through an opening 26 in the upper end bell 27 of the motor frame 15, and is provided with a socket 12a for receiving the lower end of the blade or spindle 11 to form a driving connection therewith. During operation of the motor, the bearing 23 is lubricated by oil drawn by blades 28 through the hollow shaft 24 from a lubricant reservoir 29 secured to the lower end of the stationary frame 15. A lubricant shield 30 is arranged below the bearing 23 around the hollow shaft 24 on the boss 25, and lubricant which may flow from the bearing is collected between the shield 30 and the boss 25 and returned to the lubricant reservoir 29 through an opening 31 formed in the boss 25.

Another modification of rotor and clutch construction is illustrated in Fig. 3, wherein the rotor includes a laminated core 32 provided with slots in which conductors 33 are arranged. A bearing 32a is pressed in the axial opening in the core 32 for supporting the rotor in the motor. The conductors 33 are formed as rivets making good electrical contact with a short circuiting end ring 34 arranged at the lower end of the laminated core 32, and extend through openings 35 in a clutch 36. This clutch is formed of an electrically conductive material and is utilized as a short circuiting end ring connecting together the conductors 33, which are peened over at the ends projecting through the openings 35, so as to securely rivet the clutch to the upper end of the rotor in engagement with the laminated core 32. This rotor and clutch arrangement may be used in the motor construction shown in Fig. 1.

Thus, it is seen that I have provided an improved and simplified motor construction for a spinning spindle drive which can be very economically manufactured and readily assembled.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A device for driving a spinning blade or the like including a dynamo-electric machine having a stationary member and a rotatable member arranged to rotate the spinning blade, said rotatable member having a laminated core provided with slots therein, a clutch arranged to support the spinning blade, and a cast winding having an end ring arranged on each end of said laminated core and conductors in said slots of said laminated core formed integral with said end rings, one of said end rings being provided with grooves arranged to cooperate with said clutch to secure said clutch to said laminated core.

2. A device for driving a spinning blade or the like including a dynamo-electric machine having a stationary member and a rotatable member arranged to rotate the spinning blade, said rotatable member having a laminated core provided with slots therein, a clutch arranged to support the spinning blade and formed with grooves and tongues on the outer periphery adjacent one end thereof, and a cast winding having an end ring arranged on each end of said laminated core and conductors formed integral with said end rings in said slots of said core, one of said end rings being provided with grooves and tongues arranged to cooperate with said clutch grooves and tongues to secure said clutch to said laminated core.

3. A rotatable member for a spinning motor including a clutch arranged to support a spinning blade, a laminated core provided with slots therein, and a cast winding having an end ring arranged on each end of said laminated core and conductors formed integral with said end rings arranged in said slots of said laminated core, one of said end rings being provided with grooves arranged to cooperate with said clutch to secure said clutch to said laminated core.

4. A rotatable member for a spinning motor including a clutch arranged to support a spinning blade and formed with grooves and tongues at the outer periphery adjacent one end thereof, a laminated core provided with slots therein, and a cast winding having an end ring arranged on each end of said laminated core and conductors formed integral with said end rings in said slots of said core, one of said end rings being provided with grooves and tongues arranged to cooperate with said clutch grooves and tongues to secure said clutch to said laminated core.

TAKEO SATO.